US011626897B2

(12) United States Patent
Kao

(10) Patent No.: US 11,626,897 B2
(45) Date of Patent: Apr. 11, 2023

(54) TRANSMITTER CIRCUIT, COMPENSATION VALUE CALIBRATION DEVICE AND METHOD FOR CALIBRATING IQ IMBALANCE COMPENSATION VALUES

(71) Applicant: Realtek Semiconductor Corp., HsinChu (TW)

(72) Inventor: Tzu-Ming Kao, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 17/709,356

(22) Filed: Mar. 30, 2022

(65) Prior Publication Data

US 2022/0345166 A1 Oct. 27, 2022

(30) Foreign Application Priority Data

Apr. 23, 2021 (TW) .................................. 110114733

(51) Int. Cl.
| H04B 17/00 | (2015.01) |
| H04B 1/12 | (2006.01) |
| H04B 1/30 | (2006.01) |
| H04B 1/00 | (2006.01) |

(52) U.S. Cl.
CPC ........... *H04B 1/126* (2013.01); *H04B 1/0039* (2013.01); *H04B 1/30* (2013.01); *H04B 2001/305* (2013.01)

(58) Field of Classification Search
CPC ........ H04B 1/126; H04B 1/0039; H04B 1/30; H04B 1/04; H04B 2001/0433; H04B 17/101; H04B 17/11; H04B 17/14
See application file for complete search history.

(56) References Cited

U.S. PATENT DOCUMENTS

| 8,010,064 | B2* | 8/2011 | Kim ...................... H04B 17/14 455/115.2 |
| 8,514,019 | B2* | 8/2013 | Okazaki ................ H03F 1/3247 330/149 |
| 9,276,798 | B2* | 3/2016 | Yu ......................... H04L 27/364 |
| 2003/0045249 | A1 | 3/2003 | Nielsen |
| 2012/0250790 | A1 | 10/2012 | Yang |
| 2016/0173317 | A1 | 6/2016 | Bitton |

* cited by examiner

*Primary Examiner* — Tuan Pham
(74) *Attorney, Agent, or Firm* — Winston Hsu

(57) ABSTRACT

A transmitter circuit includes at least one transmitting signal processing device, a compensation device and a compensation value calibration device. The compensation device generates a first compensated input signal and a second compensated input signal by respectively processing input signals according to a first compensation value and a second compensation value. The transmitting signal processing device generates a first output signal and a second output signal by processing the first compensated input signal and the second compensated input signal. The compensation value calibration device receives the first output signal and the second output signal as a first feedback signal and a second feedback signal, respectively, and includes a digital signal processor. The digital signal processor determines a calibrated compensation value according to power of the first feedback signal and the second feedback signal at a predetermined frequency and the first compensation value and the second compensation value.

15 Claims, 3 Drawing Sheets

TRANSMITTER CIRCUIT, COMPENSATION VALUE CALIBRATION DEVICE AND METHOD FOR CALIBRATING IQ IMBALANCE COMPENSATION VALUES

BACKGROUND OF THE INVENTION

1. Field of the Invention

The invention relates to a method for calibrating In-phase and Quadrature-phase (IQ) imbalance compensation values and a transmitter circuit utilizing the method.

2. Description of the Prior Art

There is a performance limitation of IQ imbalance in the design of a Zero Intermediate Frequency (Zero-IF) transmitter or zero-IF receiver because only one mixing stage is utilized to directly convert the baseband signal to radio frequency signal or only one mixing stage is utilized to directly convert the received RF signal to the baseband signal. The reason of causing the IQ imbalance is that when there is some difference in the in-phase channel response and the quadrature-phase channel response, the two signals passing through the in-phase channel and the quadrature-phase channel will have unequal amplitude or phase gain.

To solve the problem of IQ imbalance in the Zero-IF transmitter or zero-IF receiver, a method for effectively calibrating IQ imbalance compensation values is highly required.

SUMMARY OF THE INVENTION

It is an objective of the invention to solve the problem of IQ imbalance in the Zero-IF transmitter or zero-IF receiver by effectively calibrating IQ imbalance compensation values.

According to an embodiment of the invention, a transmitter circuit comprises a compensation device, at least one transmitting signal processing device and a compensation value calibration device. The compensation device is configured to receive an input signal, process the input signal according to a first compensation value to generate a first compensated input signal and process the input signal according to a second compensation value to generate a second compensated input signal. The at least one transmitting signal processing device, configured to receive and process the first compensated input signal and the second compensated input signal to respectively generate a first output signal and a second output signal. The compensation value calibration device is coupled to an output terminal of the at least one transmitting signal processing device and configured to receive the first output signal and the second output signal as a first feedback signal and a second feedback signal and perform a calibration operation. The compensation value calibration device comprises a digital signal processor coupled to the compensation device and configured to determine a calibrated compensation value according to power of the first feedback signal at a predetermined frequency, power of the second feedback signal at the predetermined frequency, the first compensation value and the second compensation value in the calibration operation, and provide the calibrated compensation value to the compensation device.

According to another embodiment of the invention, a compensation value calibration device to calibrate on or more compensation values utilized by a compensation device of a transmitter comprises a power spectrum density calculation device and a digital signal processor. The power spectrum density calculation device is configured to calculate power of a first feedback signal at a predetermined frequency and power of a second feedback signal at the predetermined frequency, wherein the first feedback signal and the second feedback signal are received from the transmitter, the first feedback signal is generated according to a first compensation value and the second feedback signal is generated according to a second compensation value. The digital signal processor is coupled to the power spectrum density calculation device and the compensation device and configured to determine a calibrated compensation value according to the power of the first feedback signal at the predetermined frequency, the power of the second feedback signal at the predetermined frequency, the first compensation value and the second compensation value in a calibration operation, and provide the calibrated compensation value to the compensation device.

According to another embodiment of the invention, a method for calibrating IQ imbalance compensation values comprises: calculating power of a first feedback signal at a predetermined frequency and power of a second feedback signal at the predetermined frequency, wherein the first feedback signal and the second feedback signal are received from a transmitter, the first feedback signal is generated according to a first compensation value and the second feedback signal is generated according to a second compensation value; determining a calibrated compensation value according to the power of the first feedback signal at the predetermined frequency, the power of the second feedback signal at the predetermined frequency, the first compensation value and the second compensation value; and processing an input signal subsequently received according to the calibrated compensation value.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
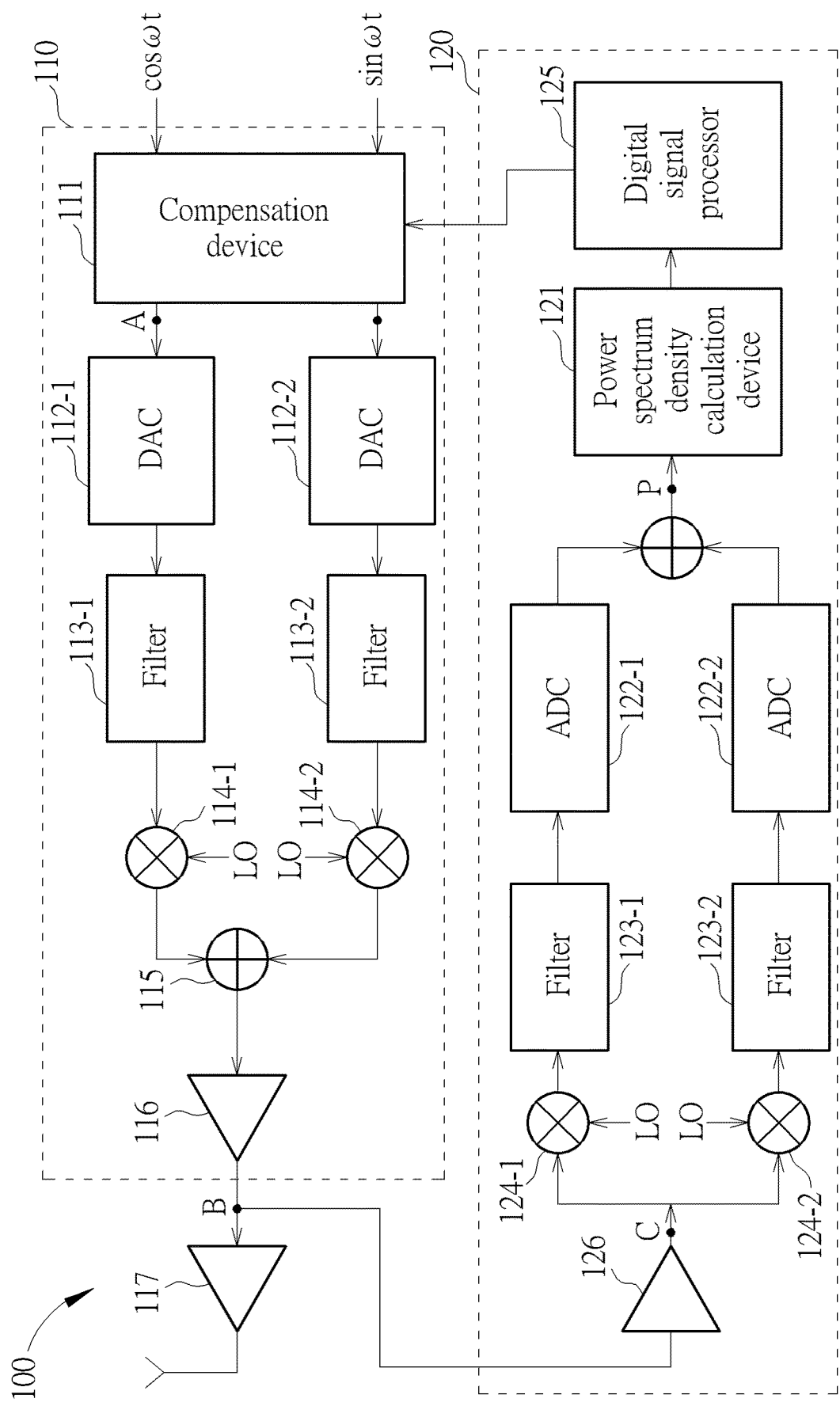
FIG. 1 shows an exemplary transmitter circuit according to an embodiment of the invention.

FIG. 1 shows an exemplary transmitter circuit according to an embodiment of the invention. The transmitter circuit 100 may comprise a transmitting signal processing path 110 and a feedback signal processing path 120. The transmitting signal processing path 110 may comprise a plurality of stages of transmitting signal processing devices configured to process the transmitting signal, as an example, converting a baseband signal to a radio frequency signal. According to an embodiment of the invention, the transmitting signal processing path 110 may comprise a compensation device 111, Digital to Analog Converters (DAC) 112-1 and 112-2, filters 113-1 and 113-2 and mixers 114-1 and 114-2 respectively on the in-phase channel and the quadrature-phase channel, an adder 115 and a buffer circuit 116. The compensation device 111 is configured to receive a test signal or an original input signal, perform compensation for IQ imbalance on the received signal according to an IQ compensation value to generate a compensated input signal. The IQ compensation value may be amplitude compensation value or phase compensation value utilized for compensating for the amplitude or the phase of the signals on the in-phase channel and the quadrature-phase channel. For example, the compensation device 111 may adjust the amplitude and phase of the received signal according to the IQ compensation value, so as to eliminate the IQ imbalance on the transmitting signal processing path.

The DAC 112-1 and the DAC 112-2 on the in-phase channel and the quadrature-phase channel are respectively configured to convert a plurality of input signals that have been compensated from digital domain to analog domain. The filter 113-1 and filter 113-2 are respectively configured to perform filtering on the received signals. The mixer 114-1 and mixer 114-2 are respectively configured to multiply the received signals with an oscillating signal LO to convert the received signal from baseband to radio frequency signal. The oscillating signals LO provided to the mixer 114-1 and mixer 114-2 are two signals having the same frequency and quadrature in phase. The adder 115 is configured to combine the signals on the in-phase channel and the quadrature-phase channel. The buffer circuit 116 may be a driving circuit of the power amplifier 117 to buffer the received radio frequency signal and drive the power amplifier 117 in the subsequent stage. The power amplifier 117 is configured to amplify the radio frequency signal before it is sent out through the antenna.

In the embodiments of the invention, the basic structure of the feedback signal processing path 120 may be designed as a zero-IF receiver. For example, the feedback signal processing path 120 may comprise a plurality of feedback signal processing devices, as an example, an attenuator 126, mixers 124-1 and 124-2, filters 123-1 and 123-2 and Analog to Digital Converters (ADC) 122-1 and 122-2 respectively on the in-phase channel and the quadrature-phase channel, a power spectrum density calculation device 121 and a digital signal processor 125, where the attenuator, the mixer, the filter, the ADC and digital signal processor are all the components of a general zero-IF receiver.

The feedback signal processing path 120 may be coupled to an output terminal of at least one transmitting signal processing device, for example, an output terminal of the buffer circuit 116, to receive an output signal generated by the transmitting signal processing device from its output terminal as a feedback signal and process the feedback signal. The attenuator 126 is configured to attenuate the received feedback signal. The mixer 124-1 and the mixer 124-2 are respectively configured to multiply the received feedback signal with the oscillating signal LO to down convert the received feedback signal from radio frequency to the baseband signal. The filter 123-1 and the filter 123-2 are respectively configured to perform filtering on the received feedback signals. The ADC 122-1 and the ADC 122-2 are respectively configured to convert the received feedback signals from analog domain to digital domain. The power spectrum density calculation device 121 is configured to perform Fast Fourier Transform (FFT) on the received feedback signal to generate the frequency domain feedback signal and calculate distribution of the power of the feedback signal in the frequency domain. The digital signal processor 125 is coupled to the power spectrum density calculation device 121 and the compensation device 111 and configured to perform a calibration operation according to information regarding the power of the feedback signal in the frequency domain, so as to calculate one or more compensation values to be used by the compensation device 111.

In the embodiments of the invention, the power amplifier 117, the antenna and the devices on the transmitting signal processing path 110 may be as a whole regarded as a transmitter, and one or more devices on the feedback signal processing path 120 may be as a whole regarded as a compensation value calibration device to assist the execution of the calibration operation and to calibrate one or more compensation values to be used by the compensation device 111 of the transmitter.

According to an embodiment of the invention, the calibration operation may comprise one or more iterative operations. At the beginning of the calibration operation, the digital signal processor 125 may set a plurality of initial compensation values used by the compensation device 111, which at least includes a first compensation value and a second compensation value, and provide a test signal to a receiving terminal of the transmitter, as an example, the receiving terminal of the compensation device 111. The initial compensation values may be arbitrarily selected values, or a value generated by appropriately adjusting a preferred compensation value obtained previously. The test signal provided to the transmitter may be a single-tone signal comprising or combining an in-phase component and a quadrature-phase component, or may be two single-tone signals having the same frequency and quadrature in phase, for example, a pair of cosine signal cos ωt and sine signal sin ωt with angular frequency ω. It is to be noted that which device generates or provides the test signal is not a limit in the invention. For example, the test signal may also be provided by another signal generating device (not shown in FIG. 1) coupled to the compensation device 111.

In addition, it is to be noted that the aforementioned compensation value may be an amplitude compensation value, a phase compensation value or a complex number, where the real part of the complex number may be the amplitude compensation value and the imaginary part of the complex number may be the phase compensation value.

In the embodiments of the invention, suppose that the transmission path between node C and node P on the feedback signal processing path 120 is an ideal transmission path, that is, no IQ imbalance exists between node C and node P or the IQ imbalance on the feedback signal processing path 120 has been well calibrated and approaches zero after the calibration, the signal processing experienced by the input signal received from the input terminal of the compensation device 111 through the transmitting signal processing path 110 and the feedback signal processing path 120 may be represented by a mathematic model.

Figure 2:
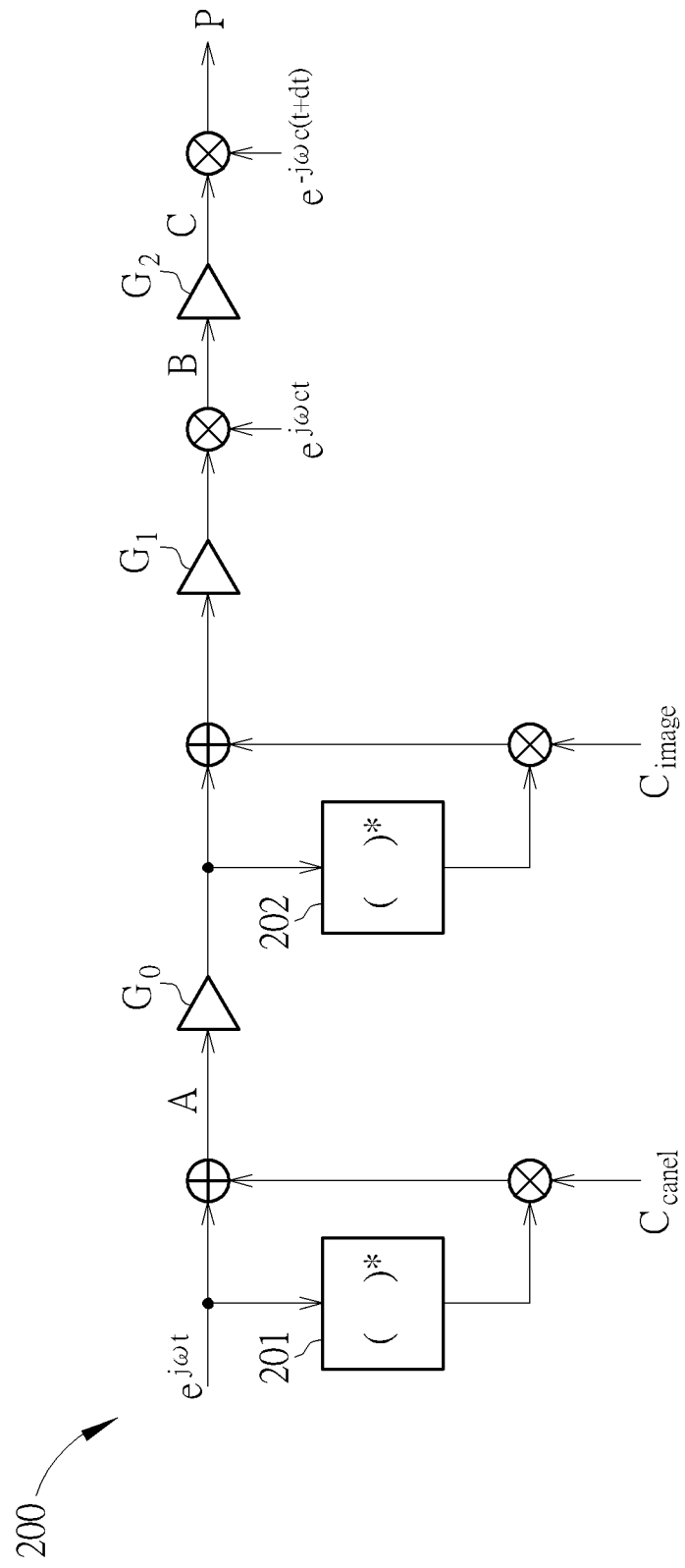
FIG. 2 is a schematic diagram of the mathematic model corresponding to the signal processing in the transmitter circuit from the input terminal of the compensation device to the node P according to an embodiment of the invention.

FIG. 2 is a schematic diagram of the mathematic model corresponding to the signal processing in the transmitter circuit from the input terminal of the compensation device 111 to the node P according to an embodiment of the invention, wherein the operation blocks 201 and 202 represent the complex conjugate operations. The signal $e^{j\omega t}$ at the input terminal of the mathematic model 200 represents a combination of the aforementioned cosine signal cos ωt and sine signal sin ωt provided to the transmitter, where $e^{j\omega t}$=cos ωt+j sin ωt. After the compensation device 111 perform IQ imbalance compensation on the amplitude and phase of the input signal (as an example, adjusting the amplitude and phase of the input signal) according to the compensation value $C_{cancel}$, the input signal will be passed to the subsequent devices on the transmitting signal processing path 110 for each device to sequentially perform corresponding processing (for example, the signal processing described in the previous paragraphs, including the signal processing respectfully performed on the in-phase channel and quadrature-phase channel) on the received input signal, and an output signal will be generated at the node B. The $C_{image}$ represents the IQ imbalance generated due to the imbalance between the in-phase channel and quadrature-phase channel from node A, the $G_0$ and $G_1$ represent the gains on the signal processing path from node A to node B. The operation of multiplying the processed signal by the signal $e^{j\omega ct}$ before entering node B represents the frequency up-conversion performed by the mixers 114-1 and 114-2. The $G_2$ represents the gain of the attenuator. The operation of multiplying the processed signal by the signal $e^{-j\omega c(t+dt)}$ before entering node P represents the frequency down-conversion performed by the mixers 124-1 and 124-2. The dt represents the overall delay on the signal processing path.

Using the mathematic model 200 as shown in FIG. 2, the mathematical expressions of the signals at the nodes A, B, and P can be derived as follows:

$$A = e^{jwt} + C_{cancel}e^{-jwt} \quad \text{Eq. (1)}$$

$$B = e^{jwct}G_1\{G_0(e^{jwt} + C_{cancel}e^{-jwt}) + \\ C_{image}[G_0(e^{jwt} + C_{cancel}e^{-jwt})]^*\} = \\ e^{jwct}G_1\{(G_0 + C_{image}G_0^*C_{cancel}^*)e^{jwt} + \\ (G_0 C_{cancel} + G_0^* C_{image})e^{-jwt}\} \quad \text{Eq. (2)}$$

$$P = e^{-jwc(t+dt)}G_2 e^{jwct}G_1\{(G_0 + C_{image}G_0^*C_{cancel}^*)e^{jwt} + \\ (G_0 C_{cancel} + G_0^* C_{image})e^{-jwt}\} = \\ e^{-jwcdt}G_2 G_1\{(G_0 + C_{image}G_0^*C_{cancel}^*)e^{jwt} + \\ (G_0 C_{cancel} + G_0^* C_{image})e^{-jwt}\} \quad \text{Eq. (3)}$$

Taking the coefficient of the signal $e^{-jwct}$ at the node P with the regular frequency $-\omega$ and organizing the coefficients as follows:

$$e^{-jwcdt}G_2 G_1(G_0 C_{cancel} + G_0^* C_{image}) = G(C_{cancel} + C_{image}) \quad \text{Eq. (4)}$$

where $G_0^* = G_0$ since the gain $G_0$ is a real number, and it can be assumed that $G = e^{-jwcdt}G_2 G_1 G_0$. The regular frequency $-\omega$ is the frequency at which the unwanted image signal is generated due to the IQ imbalance in the transmission signal processing path.

By deriving of the mathematical model 200, it can be known that when the test signal is a pair of cosine signal cos $\omega t$ and sine signal sin $\omega t$ with angular frequency $\omega$, if the compensation value $C_{cancel}$ can be calibrated to an optimal value $C_{best}$, that is, to make $C_{best} = -C_{image}$, the power of the image signal can be reduced to 0, and the IQ imbalance on the transmitting signal processing path can be effectively eliminated, where the optimal value $C_{best}$ may be a complex value, the real part of the complex value is the amplitude compensation value and the imaginary part of the complex value is the phase compensation value.

According to an embodiment of the invention, in the calibration operations, two different initial compensation values, for example, the compensation values $C_0$ and $C_1$, may be respectively set on the transmitting signal processing path 110, where the compensation values $C_0$ and $C_1$ are complex values and utilized for processing the test signal, and the power spectrum density calculation device 121 may be configured to calculate the power, for example, the power $P_0$ and $P_1$, of the two feedback signals corresponding to the initial compensation values $C_0$ and $C_1$ at the predetermined frequency, that is, the frequency where the aforementioned image signal is generated (for example, the regular frequency $-\omega$). Taking the compensation values $C_0$ and $C_1$ and the power $P_0$ and $P_1$ respectively into equation (4), the following two equations can be obtained:

$$P_0 = G(C_0 + C_{image}) \quad \text{Eq. (5)}$$

$$P_1 = G(C_1 + C_{image}) \quad \text{Eq. (6)}$$

Using equations (5) and (6), equations (7) and (8) can be derived as follows:

$$P_0/P_1 = (C_0 + C_{image})/(C_1 + C_{image}) \quad \text{Eq. (7)}$$

$$C_{image} = (P_0 C_1 - C_0 P_1)/(P_1 - P_0) \quad \text{Eq. (8)}$$

Using equation (8), equation (9) can be further derived as follows:

$$C_{best} = \\ -C_{image} = \frac{(C_0 P_1 - C_1 P_0)}{(P_1 - P_0)} = \frac{(C_0 P_1 - C_0 P_0 + C_0 P_0 - C_1 P_0)}{(P_1 - P_0)} = \\ \frac{(C_0 P_1 - C_0 P_0)}{(P_1 - P_0)} - \frac{(C_1 P_0 - C_0 P_0)}{(P_1 - P_0)} = C_0 - P_0 \frac{(C_1 - C_0)}{(P_1 - P_0)} \quad \text{Eq. (9)}$$

To be more specific, in the calibration operation, the compensation device 111 may process the input signal, for example, a pair of cosine signal cos $\omega t$ and sine signal sin $\omega t$ with angular frequency $\omega$, according to the compensation values $C_0$ and $C_1$, to respectively generate the first compensated input signal and the second compensated input signal, where the first compensated input signal may be a pair of phase quadrature signals generated by the compensation device 111 after performing the amplitude and/or phase compensation according to the compensation value $C_0$ and the second compensated input signal may be a pair of phase quadrature signals generated by the compensation device 111 after performing the amplitude and/or phase compensation according to the compensation value $C_1$.

The compensated input signal is processed by subsequent devices on the transmitting signal processing path 110 having the in-phase channel and the quadrature-phase channel to generate a first output signal and a second output signal. Then, the compensation value calibration device may receive the first output signal and the second output signal from the output terminal of the buffer circuit 116 as the first feedback signal and the second feedback signal and the power spectrum density calculation device 121 may calculate th power $P_0$ of the first feedback signal and the power $P_1$ of the second feedback signal at the predetermined frequency (for example, $-\omega$) which is the mirrored frequency of the input frequency (for example, $\omega$). Therefore, in the embodiments of the invention, an absolute value of the predetermined frequency equals to an absolute value of the input frequency. After obtaining information regarding the power $P_0$ and $P_1$, the digital signal processor 125 may use the equation (9) to calculate the optimal value $C_{best}$ as the calibrated compensation value according to the compensation values $C_0$ and $C_1$ and the power $P_0$ and $P_1$ and provide the calibrated compensation value to the compensation device 111. As shown in equation (9), the digital signal processor 125 may determine the calibrated compensation value according to a difference between the compensation values $C_0$ and $C_1$ and a difference between the power $P_0$ and $P_1$.

It should be noted that in some embodiments of the invention, the outputs of the ADC 122-1 and the ADC 122-2 in FIG. 1 may also be directly provided to the power spectrum density calculation device 121 as the real part signal and the imaginary part signal of its input, respectively, and the aforementioned signal at the node P may be calculated by the power spectral density estimation device 121.

In the embodiments of the invention, the compensation value calibration device may end the calibration operation after obtaining the optimal value $C_{best}$, or may also take the aforementioned operation as a first iteration of the calibration operation and further perform one or more iterations according to the optimal value $C_{best}$ obtained in the first iteration. In the second iteration, the compensation value calibration device may regenerate the compensation values $C_0$ and $C_1$ according to the optimal value $C_{best}$. For example, the compensation value calibration device may fine tune the optimal value $C_{best}$ to regenerate the compensation values $C_0$ and $C_1$, and the compensation device 111 may process the input signal according to the new compensation values $C_0$ and $C_1$, to respectively generate the third compensated input signal and the fourth compensated input signal, where the third compensated input signal may be a pair of phase quadrature signals generated by the compensation device 111 after performing the amplitude and/or phase compensation according to the new compensation value $C_0$ and the fourth compensated input signal may be a pair of phase quadrature signals generated by the compensation device 111 after performing the amplitude and/or phase compensation according to the new compensation value $C_1$.

The devices on the transmitting signal processing path 110 may receive and process the compensated input signals to generate the corresponding third output signal and fourth output signal. Then, the compensation value calibration device may receive the third output signal and the fourth output signal from the output terminal of the buffer circuit 116 as the third feedback signal and the fourth feedback signal and the power spectrum density calculation device 121 may calculate the power $P_0$ of third feedback signal and the power $P_1$ of the fourth feedback signal at the predetermined frequency. After obtaining information regarding the power $P_0$ and $P_1$, the digital signal processor 125 may again use the equation (9) to calculate the optimal value $C_{best}$ as the calibrated compensation value according to the new compensation values $C_0$ and $C_1$ and the power $P_0$ and $P_1$ and provide the calibrated (and updated) compensation value to the compensation device 111.

After obtaining the new optimal value $C_{best}$, the digital signal processor 125 may determine whether a next iteration of the calibration operation is required or whether to end the calibration operation. When the digital signal processor 125 determines to end the calibration operation, the digital signal processor 125 may no longer update the compensation value provided to the compensation device and make the compensation device 111 no longer receive the test signal. The digital signal processor 125 may also control the other devices on the feedback signal processing path to stop functioning. After the calibration operation is completed, the compensation device may receive normal input signal as the original input signal in the subsequent operations and perform IQ imbalance compensation on the input signal received subsequently according to the latest received compensation value to generate the compensated input signal.

Figure 3:
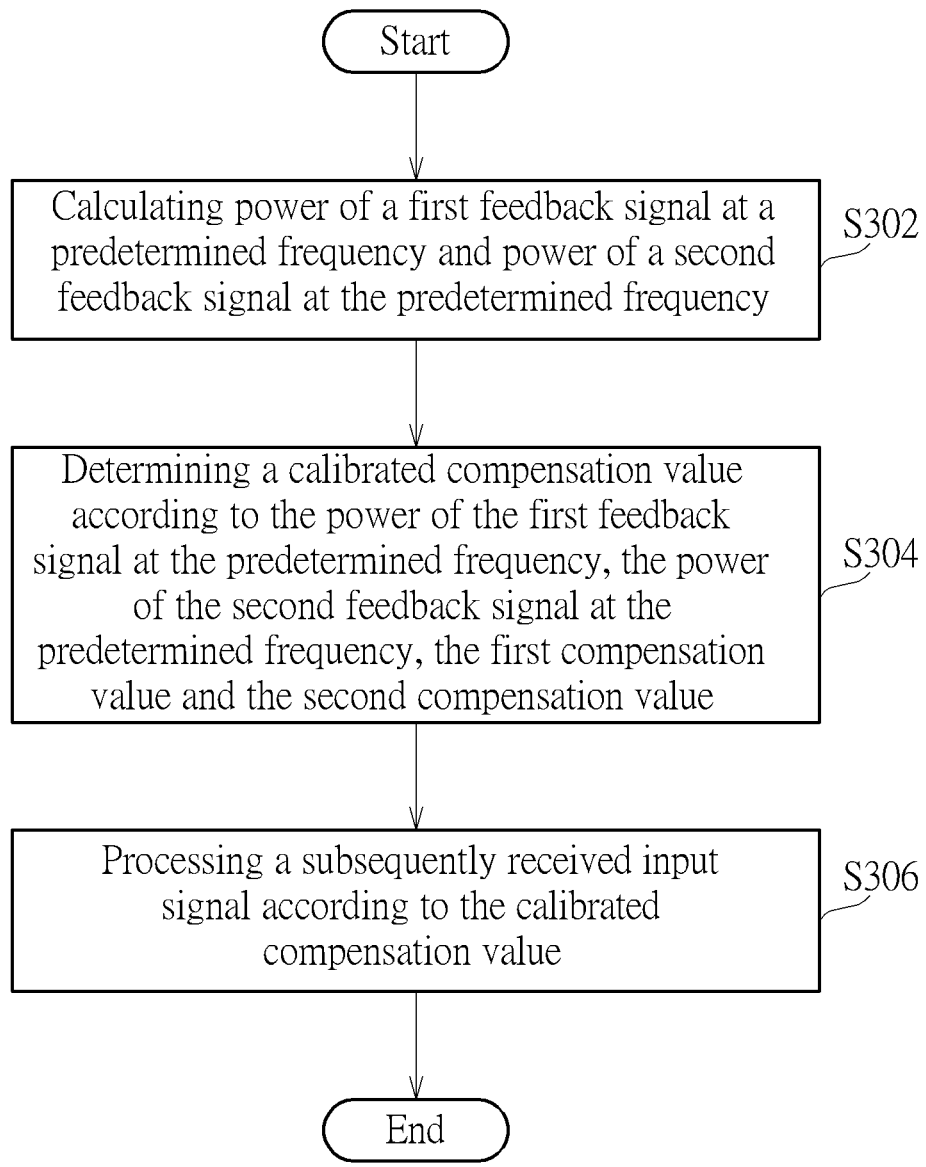
FIG. 3 shows an exemplary flow chart of a method for calibrating IQ imbalance compensation values according to an embodiment of the invention.

FIG. 3 shows an exemplary flow chart of a method for calibrating IQ imbalance compensation values according to an embodiment of the invention. The method for calibrating IQ imbalance compensation values is performed by the compensation value calibration device and comprises the following steps:

Step S302: calculating power of a first feedback signal at a predetermined frequency and power of a second feedback signal at the predetermined frequency, wherein the first feedback signal is received from the transmitter and generated according to a first compensation value, and is the output signal generated after the corresponding processing performed by one or more transmitting signal processing devices on the transmitting signal processing path 110 having an in-phase channel and a quadrature-phase channel, and the second feedback signal is received from the transmitter and generated according to a second compensation value, and is the output signal generated after the corresponding processing performed by one or more transmitting signal processing devices on the transmitting signal processing path 110 having an in-phase channel and a quadrature-phase channel.

Step S304: determining a calibrated compensation value according to the power of the first feedback signal at the predetermined frequency, the power of the second feedback signal at the predetermined frequency, the first compensation value and the second compensation value.

Step S306: processing a subsequently received input signal according to the calibrated compensation value.

According to an embodiment of the invention, step S306 may further comprise the operations of generating two new compensation values according to the calibrated compensation value and repeatedly performing step S302, S304 and S306 until the digital signal processor 125 ends the calibration operation upon determining that a predetermined number of iterations has been achieved or a predetermined condition of the power of the feedback signal at the predetermined frequency has been satisfied (for example, smaller than a threshold). When the calibration operation is ended, the transmitter may perform IQ imbalance compensation on the input signal received subsequently according to the latest received compensation value.

By applying the proposed method for calibrating IQ imbalance compensation values in the calibration operation, the energy or the power of the image signal may be gradually reduced during the calibration operation, and the IQ imbalance in the transmitter can be effectively eliminated by calibrating the compensation values utilized by the compensation device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A transmitter circuit, comprising:
   a compensation device, configured to receive an input signal, process the input signal according to a first compensation value to generate a first compensated input signal and process the input signal according to a second compensation value to generate a second compensated input signal;
   at least one transmitting signal processing device, configured to receive and process the first compensated input signal and the second compensated input signal to respectively generate a first output signal and a second output signal; and a compensation value calibration device, coupled to an output terminal of the at least one transmitting signal processing device and configured to receive the first output signal and the second output signal as a first feedback signal and a second feedback signal and perform a calibration operation, wherein the compensation value calibration device comprises:

a digital signal processor, coupled to the compensation device and configured to determine a calibrated compensation value according to power of the first feedback signal at a predetermined frequency, power of the second feedback signal at the predetermined frequency, the first compensation value and the second compensation value in the calibration operation, and provide the calibrated compensation value to the compensation device.

2. The transmitter circuit as claimed in claim 1, wherein the input signal is a single tone signal with an input frequency.

3. The transmitter circuit as claimed in claim 2, wherein an absolute value of the predetermined frequency equals to an absolute value of the input frequency.

4. The transmitter circuit as claimed in claim 1, wherein after receiving the calibrated compensation value, the compensation device is further configured to process the input signal subsequently received according to the calibrated compensation value.

5. The transmitter circuit as claimed in claim 4, wherein the compensation device is further configured to process the input signal according to a third compensation value to generate a third compensated input signal and process the input signal according to a fourth compensation value to generate a fourth compensated input signal, the third compensation value and the fourth compensation value is generated based on the calibrated compensation value; the at least one transmitting signal processing device is further configured to receive and process the third compensated input signal and the fourth compensated input signal to respectively generate a third output signal and a fourth output signal, the compensation value calibration device is configured to receive the third output signal and the fourth output signal as a third feedback signal and a fourth feedback signal, and the digital signal processor is further configured to update the calibrated compensation value according to power of the third feedback signal at the predetermined frequency, power of the fourth feedback signal at the predetermined frequency, the third compensation value and the fourth compensation value, and provide the calibrated compensation value to the compensation device.

6. The transmitter circuit as claimed in claim 1, wherein the digital signal processor is configured to determine the calibrated compensation value according to a difference between the first compensation value and the second compensation value and a difference between the power of the first feedback signal at the predetermined frequency and the power of the second feedback signal at the predetermined frequency.

7. The transmitter circuit as claimed in claim 1, wherein the compensation value calibration device further comprises a power spectrum density calculation device, configured to calculate the power of the first feedback signal at the predetermined frequency and the power of the second feedback signal at the predetermined frequency.

8. A compensation value calibration device to calibrate on or more compensation values utilized by a compensation device of a transmitter, comprising:

a power spectrum density calculation device, configured to calculate power of a first feedback signal at a predetermined frequency and power of a second feedback signal at the predetermined frequency, wherein the first feedback signal and the second feedback signal are received from the transmitter, the first feedback signal is generated according to a first compensation value and the second feedback signal is generated according to a second compensation value; and a digital signal processor, coupled to the power spectrum density calculation device and the compensation device and configured to determine a calibrated compensation value according to the power of the first feedback signal at the predetermined frequency, the power of the second feedback signal at the predetermined frequency, the first compensation value and the second compensation value in a calibration operation, and provide the calibrated compensation value to the compensation device.

9. The compensation value calibration device as claimed in claim 8, wherein an absolute value of the predetermined frequency equals to an absolute value of an input frequency of an input signal received by the compensation device.

10. The compensation value calibration device as claimed in claim 9, wherein the input signal is a single tone signal and comprises an in-phase component and a quadrature-phase component, the first feedback signal corresponds to a first compensated input signal that is generated by the compensation device by processing the input signal according to the first compensation value, and the second feedback signal corresponds to a second compensated input signal that is generated by the compensation device by processing the input signal according to the second compensation value.

11. The compensation value calibration device as claimed in claim 8, wherein the first compensation value, the second compensation value and the calibrated compensation value are amplitude or phase compensation values.

12. The compensation value calibration device as claimed in claim 8, wherein the calibrated compensation value is determined according to a difference between the first compensation value and the second compensation value and a difference between the power of the first feedback signal at the predetermined frequency and the power of the second feedback signal at the predetermined frequency.

13. A method for calibrating IQ imbalance compensation values, comprising:

calculating power of a first feedback signal at a predetermined frequency and power of a second feedback signal at the predetermined frequency, wherein the first feedback signal and the second feedback signal are received from a transmitter, the first feedback signal is generated according to a first compensation value and the second feedback signal is generated according to a second compensation value;

determining a calibrated compensation value according to the power of the first feedback signal at the predetermined frequency, the power of the second feedback signal at the predetermined frequency, the first compensation value and the second compensation value; and processing an input signal subsequently received according to the calibrated compensation value.

14. The method for calibrating IQ imbalance compensation values as claimed in claim 13, wherein the calibrated compensation value is determined according to a difference between the first compensation value and the second compensation value and a difference between the power of the first feedback signal at the predetermined frequency and the power of the second feedback signal at the predetermined frequency.

15. The method for calibrating IQ imbalance compensation values as claimed in claim 13, wherein step of processing the input signal subsequently received according to the calibrated compensation value further comprises:
- calculating power of a third feedback signal at the predetermined frequency and power of a fourth feedback signal at the predetermined frequency, wherein the third feedback signal is generated according to a third compensation value and the fourth feedback signal is generated according to a fourth compensation value, and the third compensation value and the fourth compensation value is generated based on the calibrated compensation value;
- updating the calibrated compensation value according to the power of the third feedback signal at the predetermined frequency, the power of the fourth feedback signal at the predetermined frequency, the third compensation value and the fourth compensation value; and
- processing the input signal subsequently received according to the calibrated compensation value.

\* \* \* \* \*